United States Patent Office 3,523,963
Patented Aug. 11, 1970

3,523,963
PREPARATION OF AROMATIC ISOCYANATES
Ehrenfried H. Kober, Hamden, Wilhelm J. Schnabel, Branford, and Theodore C. Kraus, Cheshire, Conn., assignors to Olin Corporation, a corporation of Virginia
No Drawing. Filed Apr. 10, 1967, Ser. No. 629,367
Int. Cl. B01j 11/22; C07c 119/04
U.S. Cl. 260—453
19 Claims

ABSTRACT OF THE DISCLOSURE

In the process for preparing an organic isocyanate by reacting an organic nitro compound with carbon monoxide in the presence of a catalyst, the improvement which comprises employing as said catalyst, a catalytic system comprised of a mixture of (a) an inorganic copper compound, (b) at least one compound selected from the group consisting of elemental palladium, elemental rhodium, palladium halides, rhodium halides, palladium oxides, and rhodium oxides, and (c) at least one oxide of an element selected from the group consisting of vanadium, molybdenum, tungsten, niobium, chromium, and tantalum.

---

This invention relates to the preparation of organic isocyanates from organic nitro compounds.

Organic isocyanates are used extensively in the preparation of urethane foams, coatings, and fibers, as well as in the preparation of insecticides, pesticides and the like. Commercial processes for preparing organic isocyanates utilize the catalytic hydrogenation of an organic nitro compound to form the corresponding amine, followed by reaction of the amine with phosgene to form the corresponding isocyanate. These processes are complex and expensive, and the need for a simplified, less expensive process is apparent.

In order to provide a simplified technique, it has been proposed to react an organic nitro compound with carbon monoxide in the presence of a catalyst. For example, British Pat. No. 1,025,436 discloses a process for preparing isocyanates from the corresponding nitro compounds by reacting an organic nitro compound with carbon monoxide in the presence of a noble metal-based catalyst. This process is not used commercially because no more than trace amounts of organic isocyanates are formed when an organic nitro compound such as dinitrotoluene is reacted with carbon monoxide using a noble metal-based catalyst, such as rhodium trichloride, palladium dichloride, iridiumtrichloride, osmium trichloride and the like.

Other proposed simplified techniques utilize other catalyst systems. For example, Belgium Pat. No. 672,405, entitled, "Process for the Preparation of Organic Isocyanates," describes the use of a catalyst system of a noble metal and/or a Lewis acid in the reaction between an organic nitro compound with carbon monoxide.

Unfortunately, the yield of organic isocyanate afforded by these simplified techniques has not been significant enough to justify their use on a commercial scale.

It is a primary object of this invention to provide an improved process for the preparation of organic isocyanates.

Another object of the invention is to provide a novel catalyst system useful in the direct conversion of organic nitro compounds to the corresponding organic isocyanates Still a further object is to provide an improved process for preparing phenyl isocyanate, toluene diisocyanates, and isocyanato-nitrotoluenes.

These and other objects of the invention will be apparent from the following detailed description thereof.

It has now been discovered that the above-mentioned objects are accomplished when an organic nitro compound is reacted with carbon monoxide at an elevated pressure and elevated temperature in the presence of a catalyst system comprised of a mixture of (a) an inorganic copper compound, (b) at least one compound selected from the group consisting of elemental palladium, elemental rhodium, palladium halides, rhodium halides, palladium oxides, and rhodium oxides, and (c) at least one oxide of an element selected from the group consisting of vanadium, molybdenum, tungsten, niobium, chromium and tantalum.

Any organic nitro compound capable of being converted to an organic isocyanate may be employed as a reactant. Generally, aromatic, cycloaliphatic, and aliphatic mono- or poly-nitro compounds which may be substituted, if desired, can be reacted to form the corresponding mono- or poly-isocyanates by the novel process of this invention. The term "organic nitro compound," is used throughout the description and claims to define unsubstituted as well as substituted organic nitro compounds of the type described herein. Typical examples of suitable organic nitro compounds which can be reacted to form isocyanates include the following:

(I) AROMATIC NITRO COMPOUNDS (a) Nitrobenzene
(b) Nitronaphthalenes
(c) Nitroanthracenes
(d) Nitrobiphenyls
(e) Bis(nitrophenyl)methanes
(f) Bis(nitrophenyl)ethers
(g) Bis(nitrophenyl)thioether
(h) Bis(nitrophenyl)sulfones
(i) Nitrodiphenoxy alkanes
(j) Nitrophenothiazines (II) NITROCYCLOALKANES (a) Nitrocyclobutane
(b) Nitrocyclopentane
(c) Nitrocyclohexane
(d) Dinitrocyclohexanes
(e) Bis(nitrocyclohexyl)methanes (III) NITROALKANES (a) Nitromethane
(b) Nitroethane
(c) Nitropropane
(d) Nitrobutanes
(e) Nitrohexanes
(f) Nitrooctanes
(g) Nitrooctadecanes
(h) Dinitroethane
(i) Dinitropropanes
(j) Dinitrobutanes
(k) Dinitrohexanes
(l) Dinitrodecanes
(m) Phenyl nitromethane
(n) Bromophenyl nitromethanes
(o) Nitrophenyl nitromethanes
(p) Methoxy phenyl nitromethanes
(q) Bis-(nitromethyl)cyclohexanes
(r) Bis-(nitromethyl)benzenes All of the aforementioned compounds may be substituted with one or more additional substituents such as nitro, nitroalkyl, alkyl, alkenyl, alkoxy, aryloxy, halogen, alkylthio, arylthio, carboxyalkyl, cyano, isocyanato, and the like, and employed as reactants in the novel process of this invention. Specific examples of suitable substituted-organic nitro compounds which can be used are as follows:

(1) o-nitrotoluene
(2) m-nitrotoluene
(3) p-nitrotoluene
(4) o-nitro-p-xylene
(5) 2-methyl-1-nitronaphthalene
(6) m-dinitrobenzene
(7) p-dinitrobenzene
(8) 2,4-dinitrotoluene
(9) 2,6-dinitrotoluene
(10) Dinitromesitylene
(11) 4,4'-dinitrobiphenyl
(12) 2,4-dinitrobiphenyl
(13) 4,4'-dinitrodibenzyl
(14) Bis(p-nitrophenyl)methane
(15) Bis(2,4-dinitrophenyl)methane
(16) Bis(p-nitrophenyl)ether
(17) Bis(2,4-dinitrophenyl)ether
(18) Bis(p-nitrophenyl)thioether
(19) Bis(p-nitrophenyl)sulfone
(20) Bis(p-nitrophenoxy)ethane
(21) α,α'-dinitro-p-xylene
(22) 2,4,6-trinitrotoluene
(23) 1,3,5-trinitrobenzene
(24) 1-chloro-2-nitrobenzene
(25) 1-chloro-4-nitrobenzene
(26) 1-chloro-3-nitrobenzene
(27) 2-chloro-6-nitrotoluene
(28) 4-chloro-3-nitrotoluene
(29) 1-chloro-2,4-dinitrobenzene
(30) 1,4-dichloro-2-nitrobenzene
(31) alpha-chloro-p-nitrotoluene
(32) 1,3,5-trichloro-2-nitrobenzene
(33) 1,3,5-trichloro-2,4-dinitrobenzene
(34) 1,2-dichloro-4-nitrobenzene
(35) alpha-chloro-m-nitrotoluene
(36) 1,2,4-trichloro-5-nitrobenzene
(37) 1-bromo-4-nitrobenzene
(38) 1-bromo-2-nitrobenzene
(39) 1-bromo-3-nitrobenzene
(40) 1-bromo-2,4-dinitrobenzene
(41) α,α-dibromo-p-nitrotoluene
(42) α-bromo-p-nitrotoluene
(43) 1-fluoro-4-nitrobenzene
(44) 1-fluoro-2,4-dinitrobenzene
(45) 1-fluoro-2-nitrobenzene
(46) o-nitrophenyl isocyanate
(47) m-nitrophenyl isocyanate
(48) p-nitrophenyl isocyanate
(49) o-nitroanisole
(50) p-nitroanisole
(51) p-nitrophenetole
(52) o-nitrophenetole
(53) 2,4-dinitrophenetole
(54) 2,4-dinitroanisole
(55) 1-chloro-2,4-dimethoxy-5-nitrobenzene
(56) 1,4-dimethoxy-2-nitrobenzene
(57) m-nitrobenzaldehyde
(58) p-nitrobenzaldehyde
(59) p-nitrobenzoylchloride
(60) m-nitrobenzoylchloride
(61) 3,5-dinitrobenzoylchloride
(62) Ethyl-p-nitrobenzoate
(63) Methyl-o-nitrobenzoate
(64) m-nitrobenzenesulfonylchloride
(65) p-nitrobenzenesulfonylchloride
(66) o-nitrobenzenesulfonylchloride
(67) 4-chloro-3-nitrobenzenesulfonylchloride
(68) 2,4-dinitrobenzenesulfonylchloride
(69) 3-nitrophthalic anhydride
(70) p-nitrobenzonitrile
(71) m-nitrobenzonitrile
(72) 1,4-dinitrocyclohexane
(73) Bis(p-nitrocyclohexyl)methane
(74) 1-nitro-n-hexane
(75) 2,2-dimethyl-1-nitrobutane
(76) 1,6-dinitro-n-hexane
(77) 1,4-bis(nitromethyl)cyclohexane
(78) 3,3'-dimethoxy-4,4'-dinitro-biphenyl
(79) 3,3'-dimethyl-4,4'-dinitro-biphenyl In addition, isomers and mixtures of the aforesaid organic nitro compounds and substituted organic nitro compounds may also be employed, as well as homologues and other related compounds. Compounds which have both nitro and isocyanato substituents, such as 2-isocyanato-4-nitrotoluene, may also be employed as a reactant. Aromatic nitro compounds are preferably employed as a reactant because the novel catalyst system of this invention appears to be more effective for these compounds. Generally, the organic nitro compounds and substituted organic nitro compounds contain between 1 and about 20 preferably between about 1 and about 14 carbon atoms.

As indicated above, the catalyst system of this invention is a mixture of (a) at least one inorganic copper compound, (b) at least one compound selected from the group consisting of elemental palladium, elemental rhodium, palladium halides, rhodium halides, palladium oxides and rhodium oxides, and (c) at least one oxide of an element selected from the group consisting of vanadium, molybdenum, tungsten, niobium, chromium and tantalum.

Suitable inorganic copper compounds include, cupric bromide ($CuBr_2$), cupric chloride ($CuCl_2$), cuprous oxide ($Cu_2O$), cupric chromate ($CuCrO_4$), cuprous bromide, cuprous chloride, cupric chloride, cupric chlorate, cupric nitrate, cupric sulfate, cupric bromate, cupric iodate, copper oxychloride, cuprous cyanide, cuprous thiocyanide, copper silicide, cupric sulfide, cuprous potassium cyanide, mixtures thereof and the like.

Catalyst components other than elemental palladium and elemental rhodium, include palladium halides such as palladium dibromide, palladium dichloride, palladium difluoride, and palladium diiodide. Rhodium halides include rhodium tribromide, rhodium trichloride, rhodium trifluoride, and rhodium triiodide. Palladium oxides include palladium suboxide ($Pd_2O$), palladium monoxide (PdO), and palladium dioxide ($PdO_2$). Rhodium oxides include rhodium monoxide (RhO), rhodium sesquioxide ($Rh_2O_3$), and rhodium dioxide ($RhO_2$). At least one of these halides or oxides of palladium or rhodium is used as a component of the mixture used as the catalyst system, but mixtures of one or more halides and one or more oxides may be employed as one component of the catalyst mixture.

Another component of the catalyst mixture is at least one oxide of an element selected from a group consisting of vanadium, molybdenum, tungsten, niobium, chromium, and tantalum. The elements are found in Groups V–B and VI–B of the Periodic Table. Suitable oxides of this type include chromic oxide ($Cr_2O_3$), chromium dioxide ($CrO_2$), and chromous oxide (CrO); molybdenum sesquioxide ($Mo_2O_3$), molybdenum dioxide ($MoO_2$), and molybdenum trioxide ($MoO_3$); niobium monoxide (NbO), niobium oxide ($NbO_2$), and niobium pentoxide ($Nb_2O_5$); tantalum dioxide ($Ta_2O_2$), tantalum tetraoxide ($Ta_2O_4$), and tantalum pentoxide ($Ta_2O_5$); tungstic oxide ($WO_2$), and tungstic trioxide ($WO_3$); vanadium dioxide ($V_2O_2$), vanadium trioxide ($V_2O_3$), vanadium tetraoxide ($V_2O_4$) and vanadium pentoxide ($V_2O_5$). Mixtures of two or more of these oxides may be employed as one component of the catalyst mixture.

Although all of the foresaid catalyst systems have some effect upon increasing the yield of organic isocyanates, certain systems are significantly more effective than others. Included in these more effective systems are the following:

(1) Cupric bromide, palladium dichloride and vanadium pentoxide (2) Cupric bromide, palladium dichloride and molybdenum dioxide
(3) Cupric bromide, rhodium trichloride and vanadium pentoxide
(4) Cupric bromide, rhodium trichloride and molybdeum dioxide
(5) Cupric bromide, palladium dichloride, rhodium trichloride and vanadium pentoxide
(6) Cupric bromide, rhodium trichloride, palladium dichloride, and molybdenum dioxide
(7) Cupric chromate, palladium dichloride and molybdenum dioxide
(8) Cupric bromide, elemental palladium and molybdenum dioxide in the presence of phosgene
(9) Cuprous oxide, elemental palladium, and molybdeum oxide in the presence of phosgene
(10) Cupric chloride, palladium dichloride and molybdenum dioxide.

The catalyst system can be self-supported or deposited on a support or carrier for dispersing the catalyst system to increase its effective surface. Alumina, silica, carbon, barium sulfate, calcium carbonate, asbestos, bentonite, diatomaceous earth, fuller's earth, and analogous materials are useful as carriers for this purpose.

The reaction is carried out in the presence of a catalytic proportion of the catalyst system. The proportion of catalyst system is generally equivalent to between about 0.1 and about 100 percent, and preferably between about 1 and about 60 percent by weight of the organic nitro compound. However, greater or lesser proportions may be employed if desired.

The inorganic copper compound is generally between about 1 and about 90 percent by weight, and preferably between about 10 and about 40 percent by weight of the catalyst system, but greater or lesser proportions may be employed if desired. The weight ratio of palladium or rhodium-containing material to oxide of the Group V–B or VI–B metals in the catalyst system is generally in the range between about 0.001:1 and about 25:1, and preferably in the range between about 0.05:1 and about 10:1.

The process of this invention operates effectively in the absence of a solvent, but improved overall yields of the organic isocyanates can be obtained when a solvent which is chemically inert to the components of the reaction system is employed. Suitable solvents include aliphatic, cycloaliphatic and aromatic solvents such as n-heptane, cyclohexane, benzene, toluene, and xylene, and halogenated aliphatic and aromatic hydrocarbons such as dichloromethane, tetrachloroethane, monochloronaphthalene, monochlorobenzene, dichlorobenzene, trichlorobenzene, and perchloroethylene, as well as sulfur dioxide, mixtures thereof and the like.

The proportion of solvent is not critical and any proportion may be employed which will not require excessively large equipment to contain. Generally, the weight percent of organic nitro compound in the solvent is in the range between about 5.0 and about 75 percent, but greater or lesser proportions may be employed if desired.

The order of mixing the reactants is not critical and may be varied within the limitations of the equipment employed. In one embodiment, the organic nitro compound, catalyst system, and, if desired, solvent, is charged to a suitable pressure vessel such as an autoclave which was previously purged with nitrogen, and which is preferably provided with agitation means such as a stirrer or an external rocking mechanism. Carbon monoxide is fed into the autoclave until a pressure is attained which is in the range between about 30 and about 10,000 p.s.i.g., and preferably between about 100 and about 8000 p.s.i.g., but greater or lesser pressures may be employed if desired.

Generally the quantity of carbon monoxide in the free space of the reactor is sufficient to maintain the desired pressure as well as provide reactant for the process, as the reaction progresses. If desired, additional carbon monoxide can be fed to the reactor either intermittently or continuously as the reaction progresses. The reaction is believed to progress in accordance with the following equation:

(I) $\quad R(NO_2)_n + 3nCO \rightarrow R(NCO)_n + 2nCO_2$ where R is the organic moiety of the organic nitro compound reactant of the type defined above, and $n$ is the number of nitro groups in the organic nitro compound. The total amount of carbon monoxide added during the reaction is generally between about 3 and about 50, and preferably between about 8 and about 15 moles of carbon monoxide per nitro group in the organic nitro compound. Greater or lesser amounts may be employed if desired. The highest carbon monoxide requirements are generally utilized in a process in which the carbon monoxide is added continuously, but suitable recycle of the carbon monoxide containing gas streams greatly reduces the overall consumption of carbon monoxide.

The reaction temperature is maintained above about 25° C. and preferably between about 100 and about 250° C. Interior and/or exterior heating and cooling means may be employed to maintain the temperature within the reactor within the desired range.

The reaction time is dependent upon the organic nitro compound being reacted, and on the amount of catalyst being charged, as well as the type of equipment being employed. Usually between one-half hour and 20 hours are required to obtain the desired degree of reaction, but shorter or longer reaction times may be employed.

The reaction can be carried out batchwise, semicontinuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation technique may be employed to separate the catalyst from the reaction product, and fractional distillation is preferably employed to isolate the organic isocyanate from the reaction product. However, other suitable separation techniques such as extraction, sublimation, etc., may be employed to separate the organic isocyanate from the unreacted organic nitro compound and any byproducts that may be formed.

Organic isocyanates produced in accordance with the technique of this invention are suitable for use in preparing urethane compounds such as foams, coatings, fibers, and the like by reacting the organic isocyanate with a suitable polyether polyol in the presence of a catalyst and, if desired, a foaming agent, and as intermediates for biologically active compounds.

The catalyst system of this invention is particularly effective when used in the process in which the organic nitro compound is reacted with carbon monoxide in the presence of a small proportion of an acid halide, as described in copending patent application Ser. No. 629,388, filed Apr. 10, 1967, by Ehrenfried H. Kober, Wilhelm J. Schnabel, Theodore C. Kraus and Gerhardt F. Ottman, entitled, "Process." In patent application Ser. No. 629,389, the small proportion of acid halide is equivalent to between about 0.005 and about 0.1 mole of acid halide per mole of nitro groups in the aromatic nitro compound. Examples of acid halides recited in the latter application are benzoyl chloride, thionyl chloride, phosgene, oxalyl chloride, sulfuryl chloride, vanadium oxychloride and phosphorus oxychloride.

The catalyst system of this invention is also particularly effective when it is suspended in a liquid and reacted with carbon monoxide at an elevated pressure and elevated temperature prior to reacting the organic nitro compound with carbon monoxide, as disclosed in the copending patent application Ser. No. 629,388, filed Apr. 10, 1967, by Ehrenfried H. Kober, Wilhelm J. Schnabel and Phillip D. Hammond, entitled, "Process."

In addition, the catalyst system is very effective when first pretreated with carbon monoxide and then employed in a reaction medium containing an acid halide as described in each of the latter two copending patent applications.

The following examples are presented to describe the invention more fully without any intention of being limited thereby. All parts and percentages are by weight unless otherwise specified.

EXAMPLE 1

A rocking autoclave, constructed of 316 stainless steel, having a volume of 103 ml. was charged with 3 g. of 2,4-dinitrotoluene, 5 ml. of orthodichlorobenzene, and based upon the weight of the dinitrotoluene, 3 percent rhodium trichloride, 3 percent palladium dichloride, 12 percent molybdenum oxide and 3 percent cupric bromide. The reactor was closed, purged, and then pressurized with carbon monoxide to about 2550 p.s.i.g. The reaction mixture was heated to 190° C., and maintained at this temperature for 1.5 hours, during which time the maximum pressure of 3830 p.s.i.g. was attained. After cooling to room temperature, the autoclave was vented and the reaction mixture was filtered. A vapor phase chromatography analysis of the filtrate indicated a conversion of 93.7 percent of the dinitrotoluene. The yield of toluene diisocyanate was 20.0 percent, of 2-isocyanato-4-nitrotoluene was 22.6 percent, and of 4-isocyanato-2-nitrotoluene was 3.6 percent.

EXAMPLE 2

The procedure of Example 1 was repeated with the exception that the orthodichlorobenzene contained 2.5 percent of phosgene. Analysis of the filtrate showed a conversion of 94.7 percent of the dinitrotoluene. The yield of toluene diisocyanate was 27.4 percent, of 2-isocyanato-4-nitrotoluene was 17.6 percent, and of 4-isocyanato-2-nitrotoluene was 5.7 percent.

EXAMPLE 3

In these examples, the catalyst was pretreated with carbon monoxide by placing the catalyst system in the autoclave of Example 1 in the proportions and in the solvent indicated in the table. In each instance, the suspension of catalyst in the solvent was subjected to a carbon monoxide pressure of approximately 3,000 p.s.i.g. at at temperature of 190° C. for approximately 1.5 hours. After pretreatment of the catalyst in this manner, the pressure was released, the autoclave was cooled, and 3 g. of 2,4-dinitrotoluene were added to the autoclave. The reaction mixture was then heated to a temperature of 190° C. for approximately 3 hours, unless indicated otherwise. The maximum pressure attained during each reaction, the percent conversion, and percent yield of toluene diisocyanate and total isocyanates are also indicated in the table.

of 1800 p.s.i.g. for a period of 1.5 hours. The conversion of nitrobenzene was 62.3 percent and the yield of phenylisocyanate was 45.5 percent.

Various modifications of the invention, some of which have been referred to above, may be employed without departing from the spirit of the invention.

What is desired to be secured by Letters Patent is:

1. The process for preparing an aromatic isocyanate which comprises reacting at an elevated temperature and an elevated pressure, an aromatic nitro compound and carbon monoxide in the presence of a catalyst system comprised of a mixture of
    (a) an inorganic copper compound, selected from the group consisting of cupric bromide, cupric chloride, cuprous oxide, cupric chromate, cuprous bromide, cuprous chloride, cupric chlorate, cupric nitrate, cupric sulfate, cupric bromate, cupric iodate, copper oxychloride, cuprous cyanide, cuprous thiocyanide, copper silicide, cupric sulfide, cuprous potassium cyanide and mixtures thereof,
    (b) a component selected from the group consisting of elemental palladium, elemental rhodium, palladium halides, rhodium halides, palladium oxides, rhodium oxides and mixtures thereof, and
    (c) an oxide of an element selected from the group consisting of vanadium, molybdenum, tungsten, niobium, chromium, and tantalum,
    (d) wherein the weight percent of said copper compound in the catalyst system is in the range between about one percent and about 90 percent, and the weight ratio of said component (b) to said oxide (c) is in the range between about 0.001 and 25:1, and
    (e) wherein the proportion of carbon monoxide is equivalent to at least 3 moles of carbon monoxide per mole of nitro groups in said aromatic nitro compound.

2. The process of claim 1 wherein said aromatic nitro compound is selected from the group consisting of nitrobenzene, monoisocyanato-mononitrotoluenes, dinitro toluenes, and mixtures thereof.

3. The process of claim 1 wherein said process is carried out in the presence of an acid halide selected from the group consisting of benzoyl chloride, thionyl chloride, phosgene, oxalyl chloride, sulfuryl chloride, vanadium oxychloride and phosphorus oxychloride, the proportion of said acid halide being equivalent to between about 0.005 to about 0.1 mole of acid halide per mole of nitro groups in the aromatic nitro compound.

4. The process of claim 1 wherein the weight percent of said copper compound in the catalyst system is in the range between about 10 and about 40 percent by weight, and the weight ratio of said component (b) to said oxide

| Exp. No. | Catalyst, percent | | | | Maximum Pressure, p.s.i.g. | Conversion, percent | TDI yield, percent | Total yield isocyanates, percent | Solvent |
|---|---|---|---|---|---|---|---|---|---|
| 3 | PdCl₂, 6 | V₂O₅, 12 | CuBr₂, 3 | M | 3,540 | 69.3 | 6.1 | 43.6 | A |
| 4 | PdCl₂, 6 | MoO₂, 12 | CuBr₂, 6 | | 3,650 | 95.2 | 14.3 | 40.6 | A |
| 5 | RhCl₃, 6 | MoO₂, 12 | CuBr₂, 3 | | 3,610 | 100. | 31.6 | 44.1 | B |
| 6 | RhCl₃, 3 | PdCl₂, 3 | MoO₂, 12 | CuBr₂, 3 | 3,550 | 84.7 | 21.7 | 68.9 | B |
| 7 | RhCl₃, 3 | PdCl₂, 3 | V₂O₂, 12 | CuBr₂, 3 | 3,510 | 69.9 | 13.0 | 83.8 | B |
| 8 | Pd°, 3 | MoO₂, 6 | CuBr₂, 3 | M | 3,700 | 92.3 | 11.0 | 28.7 | C |
| 9 | PdCl₂, 6 | MoO₂, 12 | CuCrO₄, 3 | M | 3,800 | 89.5 | 10.0 | 33.3 | B |
| 10 | PdCl₂, 1 | MoO₂, 6 | CuCl₂, 5 | N, M | 4,110 | 59.0 | 15.8 | 44.1 | A |
| 11 | RhCl₃, 6 | MoO₂, 12 | CuBr₂, 3 | P | 4,000 | 92.1 | 9.6 | 18.4 | A |
| 12 | RhCl₃, 6 | MoO₂, 12 | CuBr₂, 3 | S | 4,195 | 100 | 39.3 | 44.0 | B |
| 13 | Pd°, 3.3 | MoO₂, 6 | Cu₂O, 3 | M | 3,690 | 78.6 | 10.2 | 17.0 | C |

A—5 ml orthodichlorobenzene. B—A containing 2.5 percent phosgene. C—A containing 5 percent phosgene. M—Reaction period of 1.5 hours. N—PdCl₂ and CuCl₂ added as 2 grams of silicon carbide impregnated with 1.5 percent PdCl₂ and 7.2 percent CuCl₂. P—RhCl₃ added as 2 grams of carbon impregnated with 9 percent RhCl₃. S—CuBr₂ added as 1 gram of sintered aluminum oxide impregnated with 9 percent CuBr₂.

EXAMPLE 4

To the autoclave of Example 1 were charged 6 g. of nitrobenzene and, based upon the weight of nitrobenzene, 1 percent rhodium trichloride, 6 percent vanadium pentoxide and 1 percent cupric bromide. The procedure of Example 1 was followed, in which the reaction was carried out at a temperature of 190° C. at a maximum pressure (c) is in the range between about 0.05:1 and about 10:1.

5. The process of claim 4 wherein said catalyst system is a mixture of rhodium trichloride, palladium dichloride, molybdenum dioxide, and cupric bromide.

6. The process of claim 4 wherein said catalyst system is a mixture of rhodium trichloride, palladium dichloride, vanadium pentoxide and cupric bromide.

7. The process of claim 4 wherein said catalyst system is a mixture of elemental palladium, molybdenum dioxide, and cupric bromide in the presence of phosgene the proportion of said phosgene being equivalent to between about 0.005 and about 0.1 mole of phosgene per mole of nitro groups in said aromatic nitro compound.

8. The process of claim 4 wherein said catalyst system is a mixture of elemental palladium, molybdenum dioxide and cuprous oxide in the presence of phosgene the proportion of said phosgene being equivalent to between about 0.005 and about 0.1 mole of phosgene per mole of nitro groups in said aromatic nitro compound.

9. The process of claim 4 wherein said catalyst system is a mixture of palladium dichloride, molybdenum dioxide and cupric chloride.

10. The process of claim 4 wherein said inorganic-copper compound is cupric bromide.

11. The process of claim 10 wherein said compound (b) is rhodium trichloride and said oxide (c) is molybdenum dioxide.

12. The process of claim 11 wherein said aromatic nitro compound is dinitrotoluene and said aromatic isocyanate is toluene diisocyanate.

13. The process of claim 12 wherein said reaction is carried out in the presence of a small proportion of phosgene.

14. The process of claim 4 wherein said inorganic copper compound is cupric chromate.

15. The process of claim 4 wherein said inorganic copper compound is cuprous oxide.

16. The process of claim 4 wherein said inorganic copper compound is cupric chloride.

17. The process of claim 16 wherein said compound (b) is rhodium trichloride and said oxide (c) is molybdenum dioxide.

18. The process of claim 17 wherein said aromatic nitro compound is dinitrotoluene and said aromatic isocyanate is toluene diisocyanate.

19. The process of claim 18 wherein said reaction is carried out in the presence of a small proportion of phosgene the proportion of said phosgene being equivalent to between about 0.005 and about 0.1 mole of phosgene per mole of nitro groups in said aromatic nitro compound.

References Cited

UNITED STATES PATENTS

| 1,848,723 | 3/1932 | Jaeger | 252—415 XR |
| --- | --- | --- | --- |
| 3,057,915 | 10/1962 | Riemenschneider et al. | 252—415 XR |
| 3,405,156 | 10/1968 | Stern et al. | 260—453 |

FOREIGN PATENTS

| 672,405 | 5/1966 | Belgium. |
| --- | --- | --- |

OTHER REFERENCES

Olah: "Friedel-Crafts and Related Reaction," vol. I, Interscience Publishers, New York, pp. 308–12 (1964).

CHARLES B. PARKER, Primary Examiner

D. H. TORRENCE, Assistant Examiner

U.S. Cl. X.R.

252—438, 439, 440, 441, 470, 474; 260—2.5, 243, 346.3, 397.6, 465. 471, 543, 544, 599, 607, 609, 612, 613, 644, 645, 646, 999